(12) United States Patent  
Bi et al.

(10) Patent No.: US 6,278,972 B1  
(45) Date of Patent: Aug. 21, 2001

(54) SYSTEM AND METHOD FOR SEGMENTATION AND RECOGNITION OF SPEECH SIGNALS

(75) Inventors: Ning Bi; Chienchung Chang, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/225,891

(22) Filed: Jan. 4, 1999

(51) Int. Cl.[7] .................................................. G01L 15/04
(52) U.S. Cl. ........................... 704/248; 704/254; 704/253
(58) Field of Search ................................... 704/254, 249, 704/206, 200, 219, 253, 205, 248, 250

(56) References Cited

U.S. PATENT DOCUMENTS

| | | | |
|---|---|---|---|
| 4,813,074 | * 3/1989 | Marcus | 704/254 |
| 5,056,150 | 10/1991 | Yu et al. | 381/43 |
| 5,832,425 | * 11/1998 | Mead | 704/221 |

FOREIGN PATENT DOCUMENTS 0831455    3/1998   (EP) ............................... G10L/3/00

OTHER PUBLICATIONS

Zue, V et al "Acoustic segmentation and phonetic classification in the Summit system" IEEE, 1989, p. 389–392.*
Glass, J.R. et al "Multi–level acoustic segmentation of continuous speech" IEEE, 4/88, p. 429–432.*
Wilcox, L et al "Segmentaion of speech using speaker identification" IEEE, 4/94, p. 161–164.*
Rabiner, L.R. "Fundamentals of speech recognition" 1993, Prentice Hall, p. 242–250, 263.*
1981 J. Acoustic Soc. Of America, vol. 69(5), "Segmenting Speech Using Dynamic Programming", J. Cohen, pp. 1430–1438.
1986 AT&T Technical Journal, vol. 65(3), "A Segmental K–Means Training Procedure for Connected Word Recognition", L.R. Rabiner et al., pp. 21–31.
Pauws, et al. "A Hierarchical Method of Automatic Speech Segmentation for Synthesis Applications" Speech Communications 19:207–220 (1996).

* cited by examiner

Primary Examiner—Richemond Dorvil
(74) Attorney, Agent, or Firm—Philip R. Wadsworth; Thomas R. Rouse; Kent D. Baker

(57) ABSTRACT

A system and method for forming a segmented speech signal from an input speech signal having a plurality of frames. The input speech signal is converted from a time domain signal to a frequency domain signal having a plurality of speech frames, wherein each speech frame in the frequency domain signal is represented by at least one spectral value associated with the speech frame. A spectral difference value is then determined for each pair of adjacent frames in the frequency domain signal, wherein the spectral difference value for each pair of adjacent frames is representative of a difference between the at least one spectral value associated with each frame in the pair of adjacent frames. An initial cluster boundary is set between each pair of adjacent frames in the frequency domain signal, and a variance value is assigned to each cluster in the frequency domain signal, wherein the variance value for each cluster is equal to one of the determined spectral difference values. Next, a plurality of cluster merge parameters is calculated, wherein each of the cluster merge parameters is associated with a pair of adjacent clusters in the frequency domain signal. A minimum cluster merge parameter is selected from the plurality of cluster merge parameters. A merged cluster is then formed by canceling a cluster boundary between the clusters associated with the minimum merge parameter and assigning a merged variance value to the merged cluster, wherein the merged variance value is representative of the variance values assigned to the clusters associated with the minimum merge parameter. The process is repeated in order to form a plurality of merged clusters, and the segmented speech signal is formed in accordance with the plurality of merged clusters.

25 Claims, 7 Drawing Sheets

SYSTEM AND METHOD FOR SEGMENTATION AND RECOGNITION OF SPEECH SIGNALS

BACKGROUND OF THE INVENTION

I. Field of the Invention

The present invention relates generally to speech recognition. More particularly, the present invention relates to a system and method for segmentation of speech signals for purposes of speech recognition.

II. Description of the Related Art

Pattern recognition techniques have been widely used in speech recognition. The basic idea in the technique is to compare the input speech pattern with a set of templates, each of which represents a pre-recorded speech pattern in a vocabulary. The recognition result is the word in the vocabulary associated with the template which has the most similar speech pattern to that of the input speech pattern.

For human beings, it is usually not necessary to hear all the detail in an utterance (e.g., a word) in order to recognize the utterance. This fact shows that there are some natural redundancies inherent in speech. Many techniques have been developed to recognize speech taking advantage of such redundancies. For example, U.S. Pat. No. 5,056,150 to Yu et al. discloses a real time speech recognition system wherein a nonlinear time-normalization method is used to normalize a speech pattern to a predetermined length by only keeping spectra with significant time-dynamic attributes. Using this method, the speech pattern is compressed significantly, although it may occasionally keep the same spectrum repeatedly.

Another technique for speech recognition employs a sequence of acoustic segments, which represent a sequence of spectral frames. The segments are the basic speech units upon which speech recognition is based. One procedure for generating the acoustic segments, or performing segmentation, is to search for the most probable discontinuity points in the spectral sequence using a dynamic programming method. These selected points are used as the segment boundaries. See J. Cohen, "Segmenting Speech Using Dynamic Programming," J. Acoustic Soc. of America, May 1981, vol. 69(5), pp. 1430–1437. This technique, like the technique of U.S. Pat. No. 5,056,150 described above, is based on the searching of significant time-dynamic attributes in the speech pattern.

Another technique used to segment speech is based on the segmental K-means training procedure. See L. R. Rabiner et al., "A Segmental K-means Training Procedure for Connected Word Recognition," AT&T Technical Journal, May/June 1986 Vol. 65(3), pp. 21–31. Using an iterative training procedure, an utterance is segmented into words or subword units. Each of the units is then used as a speech template in a speech recognition system. The iterative training procedure requires many steps of computation, so that it cannot be implemented in real time.

These problems and deficiencies are recognized and solved by the present invention in the manner described below.

SUMMARY OF THE INVENTION

The present invention is directed to a system and method for forming a segmented speech signal from an input speech signal having a plurality of frames. The segmented speech signal provides a template upon which speech recognition is based. First, the input speech signal is converted to a frequency domain signal having a plurality of speech frames, wherein each speech frame of the frequency domain signal is represented by at least one but usually multiple spectral values associated with the speech frame. The spectral values are generally chosen to encapsulate the acoustic content of the speech frame. A spectral difference value is then determined for each pair of adjacent frames of the frequency domain signal. The spectral difference value represents a difference between the spectral values for the pair of adjacent frames. The spectral difference value is indicative of the time-dynamic attributes between the frames. An initial cluster boundary is set between each pair of adjacent frames in the frequency domain signal, and a variance value is assigned to each single-frame cluster in the frequency domain signal, wherein the variance value for each single-frame cluster is equal to the corresponding spectral difference value. Next, a cluster merge parameter is calculated for each pair of adjacent clusters. The cluster merge parameter is computed based on the spectral difference values of the adjacent clusters. A minimum cluster merge parameter is selected from the plurality of cluster merge parameters. The minimum merge parameter is indicative of the most insignificant time-dynamic attribute. A merged cluster is then formed by canceling a cluster boundary between the clusters associated with the minimum merge parameter and assigning a merged variance value to the merged cluster, wherein the merged variance value is representative of the variance values assigned to the clusters associated with the minimum merge parameter. The process is repeated in order to form a plurality of merged clusters, and the segmented speech signal is formed in accordance with the plurality of merged clusters.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1A:
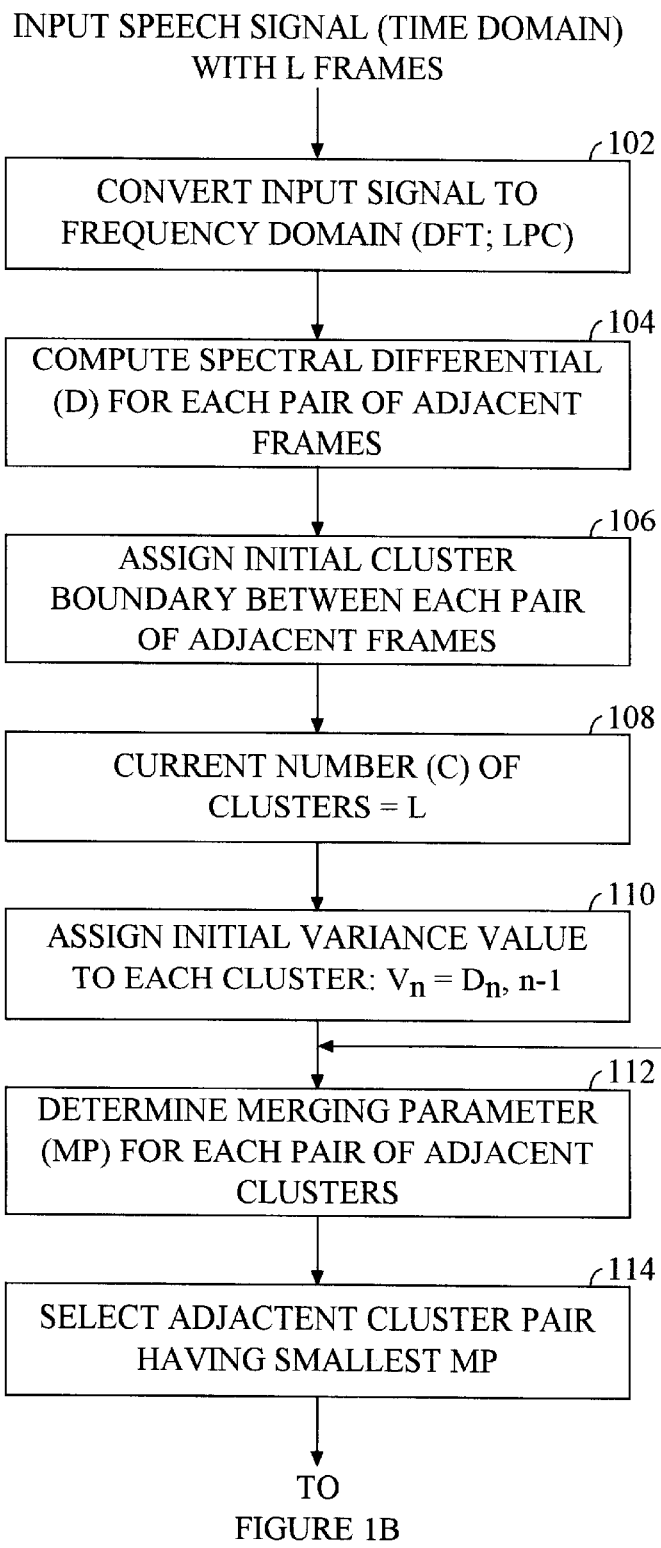
FIGS. 1A and 1B are a flow diagram showing the operation of a method for converting a time-domain input speech signal into an output segmented speech signal.
Figure 1B:
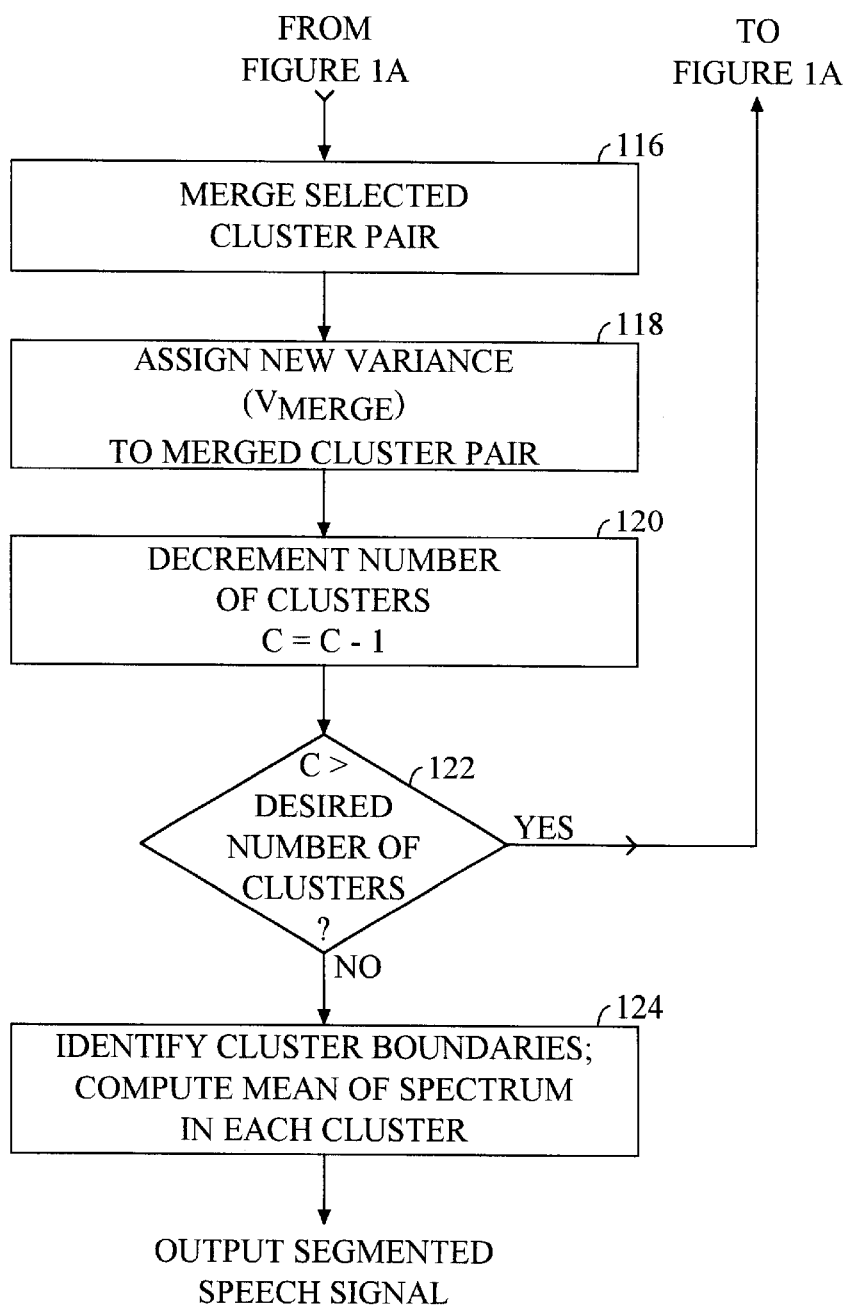

Referring now to FIGS. 1A and 1B, there is shown a flow diagram illustrating the operation of a method 100 for converting a time-domain input speech signal into an output segmented speech signal. As described more fully below, method 100 includes a "time-clustering" algorithm that non-linearly segments a speech signal in order to reduce memory requirements and facilitate speech recognition.

Initially, in step 102 an input time-domain speech signal representative of an "utterance" is converted to a frequency-domain spectral representation using a known transformation algorithm such as discrete Fourier transform (DFT), band pass filter bank, linear predictive coding (LPC) coefficients, line spectrum pairs (LSP), or cepstral coefficients on a frame basis. In a preferred embodiment, a separate frequency-domain spectrum is generated from the input speech waveform every 10 msec using a 20 msec time window. Thus, the windows have a 10 msec overlap. Each frequency-domain spectrum ($S_i$) corresponds to a speech frame (n) and preferably includes at least 6 discrete spectral values and, in the preferred embodiment, each spectrum contains 13 spectral values (i.e., i=1 to 13). The frequency-domain speech signal output by step 102 will include L speech frames and may thus be represented by expression (1) below:

$$S_{n,i} \text{ for } i=1 \text{ to } 13, n=1 \text{ to } L \tag{1}$$

Figure 4:
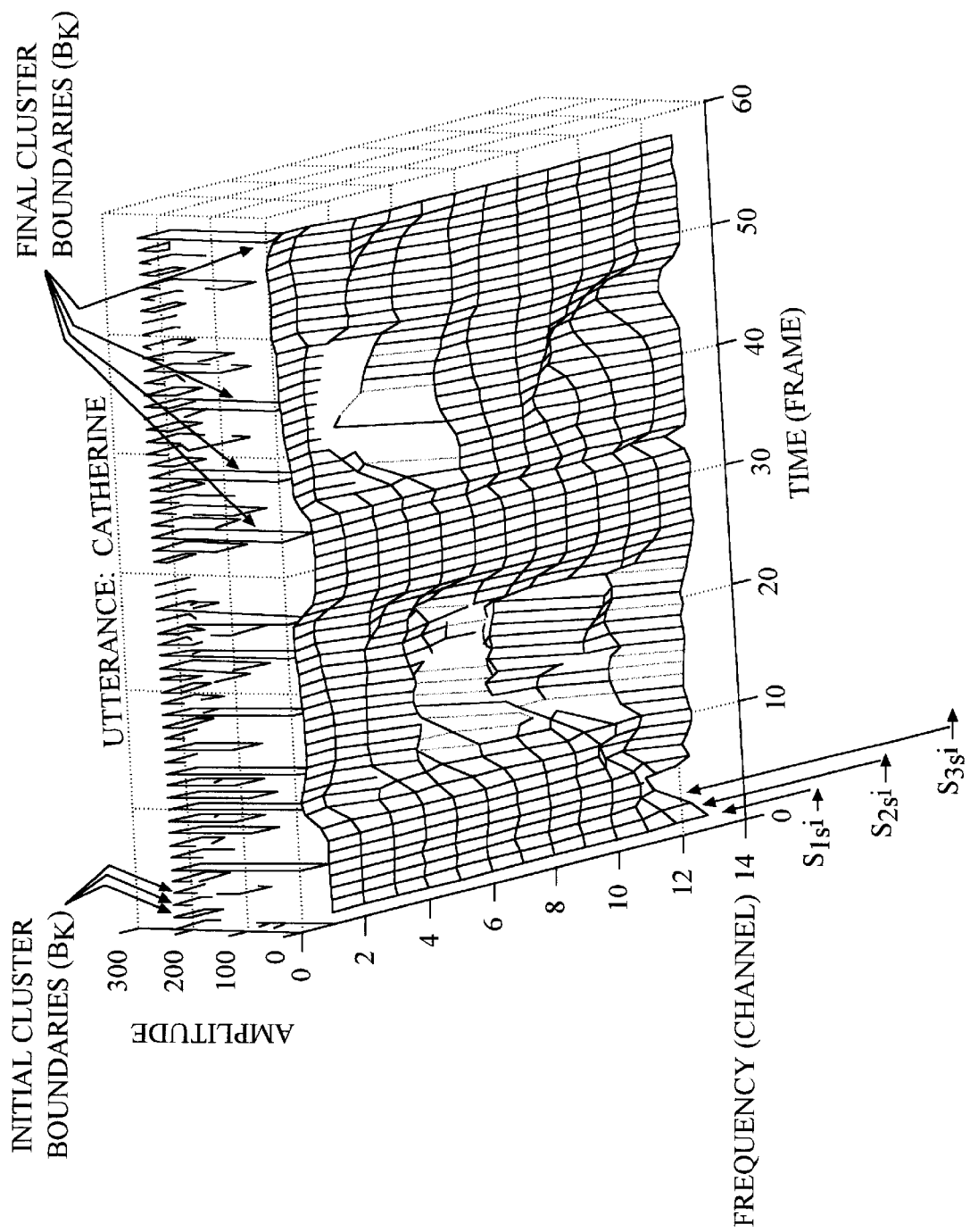
FIG. 4 is a graph illustrating the frequency domain signals and final cluster boundaries associated with an exemplary utterance that has been processed in accordance with the present invention.

A graphical representation of a frequency-domain speech signal that includes 58 frames (L=58) is shown in FIG. 4. As shown in FIG. 4, each of the 58 frames may be represented in the frequency-domain by a vector of 13 spectral values. The input speech waveform that is converted to the frequency-domain in step 102 is preferably limited to only that portion of a time-domain speech signal that includes an "utterance" (an "utterance" is, for example, a single word or phrase). The utterance represented by the graph in FIG. 4 corresponds to the word "Catherine."

In step 104, a spectral difference value is calculated for each pair of adjacent frames (n–1, n) in the frequency-domain signal output from step 102. The spectral difference value for each pair of adjacent frames (n–1, n) is representative of a difference between the respective spectral values associated with each frame in the pair of adjacent frames. In a preferred embodiment where the band pass filter bank is used to convert the input time-domain waveform to the frequency-domain (in step 102), the spectral difference value for each pair of adjacent frames (n–1, n) may be represented by expression (2) below:

$$D_{n-1,n} = \sum_{i=1}^{I} |S_{n-1,i} - S_{n,i}| \tag{2}$$

Alternatively, if LPC coefficients were used to convert from the time-domain to the frequency-domain in step 102, the spectral difference value for each pair of adjacent frames ($D_{n-1,n}$) would correspond to the Itakura distortion between the pair of spectra, and if cepstral coefficients or discrete Fourier transform were used to convert from the time-domain to the frequency-domain in step 102, the spectral difference value for each pair of adjacent frames would correspond to the Euclidean distance between the pair of spectra.

Next, in step 106, an initial cluster boundary ($B_k$) is assigned between each pair of adjacent frames in the frequency-domain signal output from step 102. These initial cluster boundaries are illustrated in FIG. 4. Thus, initially, the frequency-domain signal output from step 102 will be segmented into L clusters, each of which corresponds to one of the frames from the frequency-domain signal output in step 102. In step 108, a counter "c" denoting the current number of clusters in the frequency-domain signal is initialized to L (i.e., "c" is initialized to the number of frames in the frequency-domain signal output from step 102). Furthermore, in step 110, an initial variance value ($V_n$) is assigned to each cluster in the frequency-domain signal. In a preferred embodiment, the initial variance value assigned to each cluster will correspond to the spectral difference value (calculated in step 104) associated with the cluster. The variance value for each cluster (n) may thus be represented by expression (3) below:

$$V_n = D_{n-1,n} \ n=2, \ldots, L \tag{3}$$

In step 112, a cluster merge parameter (CMP) is calculated for each pair of adjacent clusters in the frequency-domain signal. The cluster merge parameter corresponding to each pair of adjacent clusters is representative of the combined variance that would result if the pair of adjacent clusters were merged together. In the preferred embodiment, the cluster merge parameters $\{CMP_i\}_{i=2}^{c}$ are calculated in accordance with equation (4) below:

$$CMP_i = w_1 * V_i + w_2 * (V_i + V_{i-1}), \ i=2,3,\ldots,c, \tag{4}$$

where $w_1$ and $w_2$ are weighting factors that range from 0 to 1. In the preferred embodiment, $w_1$ and $w_2$ are both set equal to 0.5. In step 114, the set of CMPs calculated in step 112 are evaluated, and the cluster k having the minimum CMP associated therewith is selected in accordance with equation (5) below:

$$k = \arg \min_{i=2,\ldots,c} CMP_i \tag{5}$$

Next, in steps 116 and 118, the cluster having the minimum CMP (i.e., the kth cluster) is "merged" into the preceding adjacent cluster (i.e., the (k–1)th cluster) by changing the (k–1)th cluster boundary to the kth cluster boundary and assigning a new variance for the merged cluster $V_{merge}$ in accordance with equations (6) and (7) as follows:

$$B'_{k-1} = B_k \tag{6}$$

$$V_{merge} = V'_{k-1} = V_{k-1} V_k \tag{7}$$

Figure 5:
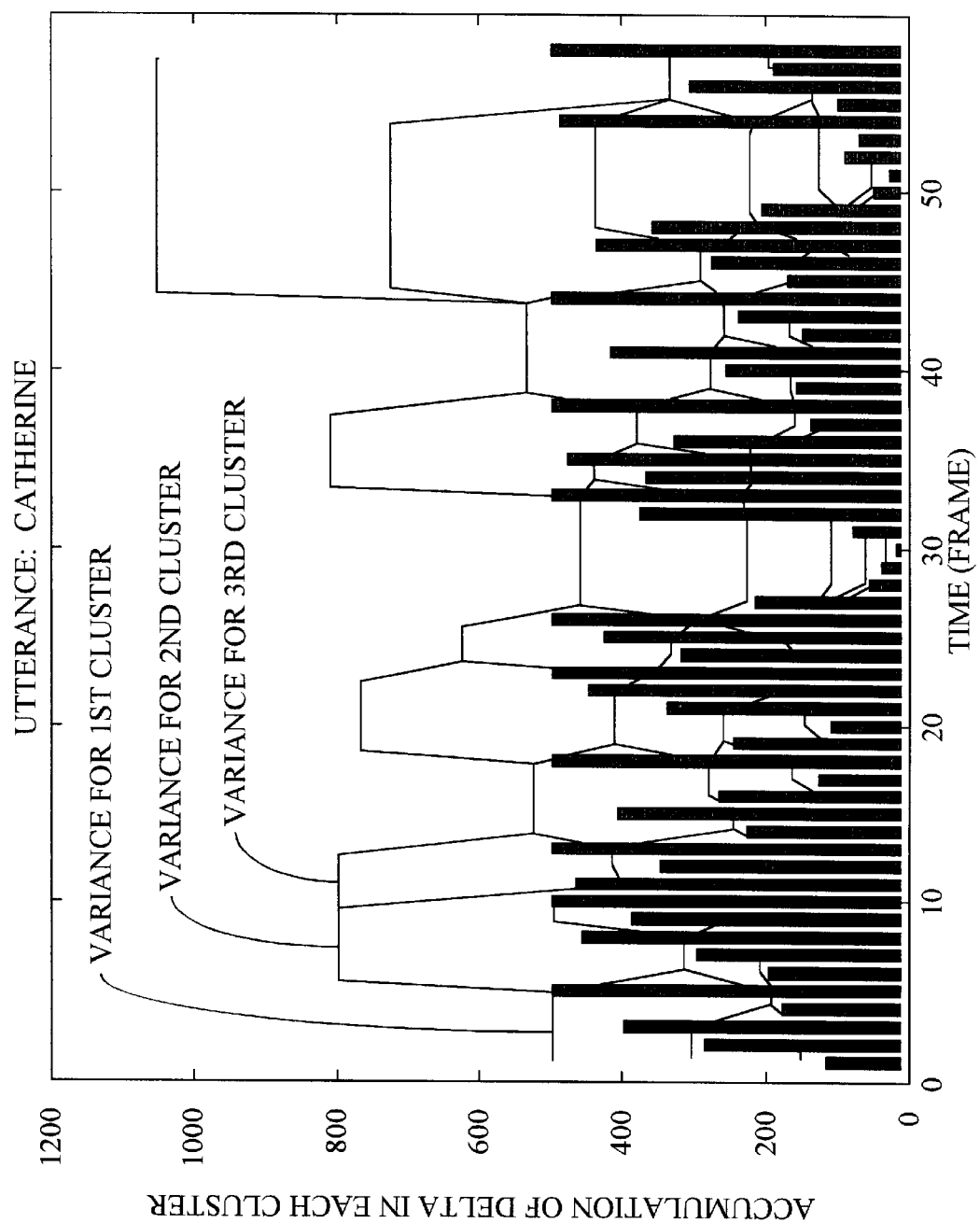
FIG. 5 is a graph illustrating the variance values associated with each final merged cluster shown in FIG. 4.

In step 120, the value of the counter "c" is decremented by 1, and in step 122, the value of the counter "c" is compared to a desired number of clusters. The desired number of clusters is preferably set to achieve a specified level of signal compression. Thus, if the original frequency-domain speech signal output from step 102 had 58 frames, and the goal of method 100 was to achieve about a 6:1 compression ratio, the desired number of clusters used in step 122 would be set equal to 10 (⅙ of 58). The steps 112, 114, 116, 118 and 120 are repeated until the desired number of clusters is obtained. For instance, referring to FIG. 4, the desired number of clusters was set to 10, and the final cluster boundaries ($B'_k$) for these 10 clusters are shown in FIG. 4. The associated variance values are shown in FIG. 5. Significantly, during the process loop depicted by steps 112, 114, 116, 118 and 120, the variance values may be computed by summing variance values determined in step 110 and in previous iterations of the process loop, thereby streamlining the computation requirements of the system during execution of the process loop.

Finally, in step 124, a representative spectrum ($S\text{-}REP_i$) for each final cluster is determined by calculating the mean of the spectra ($S_{n,i}$) within each final cluster (as defined by the final cluster boundaries ($B'_k$)) in accordance with equation (8) below:

$$S_i^{rep} = \frac{1}{N(i)} \sum_{n=1}^{N(i)} S_{n,i} \qquad (8)$$

where N(i) represents the number of frames in cluster i.

Alternatively, $S_i^{rep}$ may be approximated by a member spectrum, $S_{n,i}$, closest to $S_i^{rep}$ in Euclidean distance. In the preferred embodiment, the representative spectra $\{S_i^{rep}\}_{i=1}^c$ corresponding to the final clusters are concatenated in order to form an output segmented speech representation which is more compact than the original frequency domain signal output from step 102.

Figure 2:
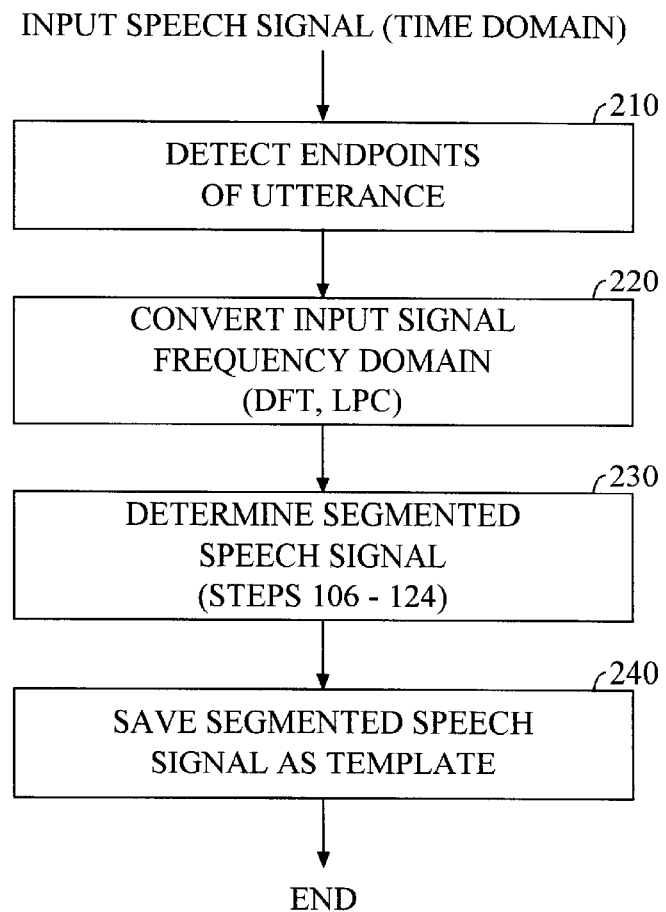
FIG. 2 is a flow diagram showing the operation of a method for saving a plurality of speech templates, wherein each saved speech template is representative of a known speech utterance.

Referring now to FIG. 2, a flow diagram is shown illustrating the operation of a method 200 for saving a plurality of speech templates, wherein each saved speech template is representative of a speech utterance which is known before processing. In step 210, an input time domain speech signal is processed using known methods to detect the endpoints of a speech utterance. Next, in step 220, the portion of the input speech signal representing the utterance (i.e., the portion of the speech signal between the endpoints detected in step 210) is converted to a frequency domain representation. The method used to convert the input speech signal to the frequency domain representation in step 220 is substantially the same as that used in step 102 described above. Next, in step 230 the frequency domain signal from step 220 is converted to a segmented speech signal. Step 230 is performed substantially in accordance with steps 106–124 described above. Finally, in step 240, the segmented speech signal corresponding to the known utterance is saved in memory.

One useful application of the present invention is to recall previously stored telephone numbers in a mobile telephone. The speech template of a known utterance corresponding to the name of a person can be used by a speech recognition system to recall the desired telephone number. As explained more fully in connection with FIG. 3 below, the stored speech templates can then be used as part of speech recognition system in order to allow the user of the mobile phone to recall a stored telephone number associated with a particular person simply by reciting the person's name into the microphone.

Figure 3:
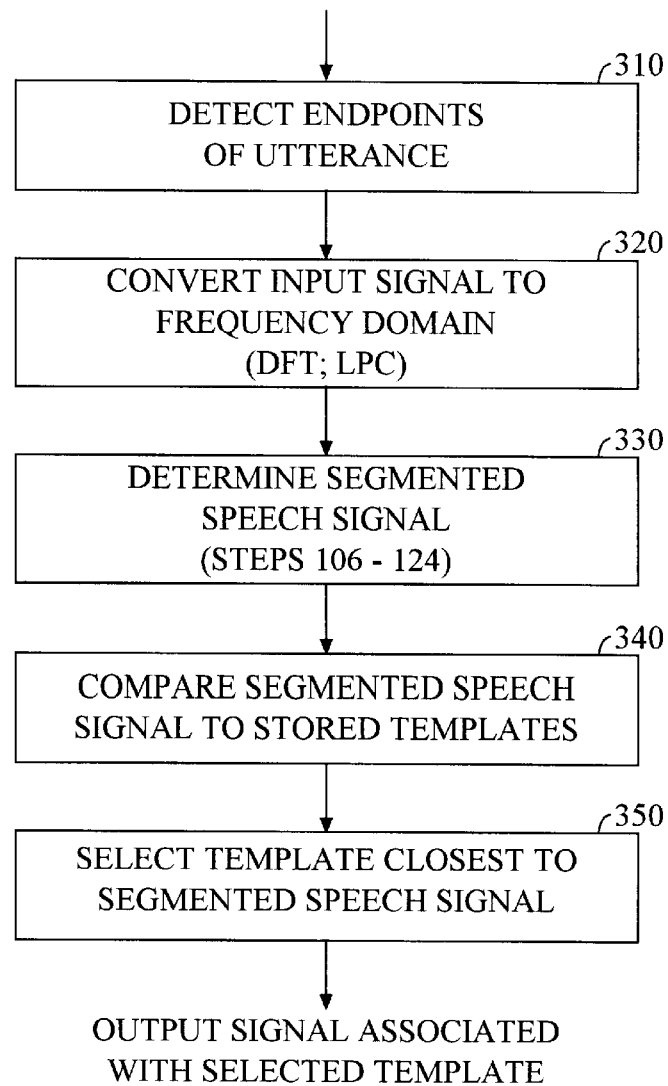
FIG. 3 is a flow diagram showing the operation of a method for recognizing an utterance from an input speech signal.

Referring now to FIG. 3, there is shown a flow diagram illustrating the operation of a method 300 for recognizing an utterance from an input speech signal. In step 310, an input time domain speech signal is processed using known methods to detect the endpoints of a speech utterance included within the signal. Next, in step 320, the portion of the input speech signal representing the utterance (i.e., the portion of the speech signal between the endpoints detected in step 310) is converted to the frequency domain. The process used for converting the input speech signal to the frequency domain in step 320 is substantially the same as that used in step 102 described above. Next, in step 330, the frequency domain signal from step 320 is converted to a segmented speech signal. Step 330 is performed substantially in accordance with steps 106–124 described above. In step 340, the segmented speech signal is compared against speech templates previously saved in memory (as set forth in step 240). Finally, in step 350 the speech template that is closest in Euclidean space to the segmented speech signal is selected, and a signal associated with the selected template is output.

Figure 6:
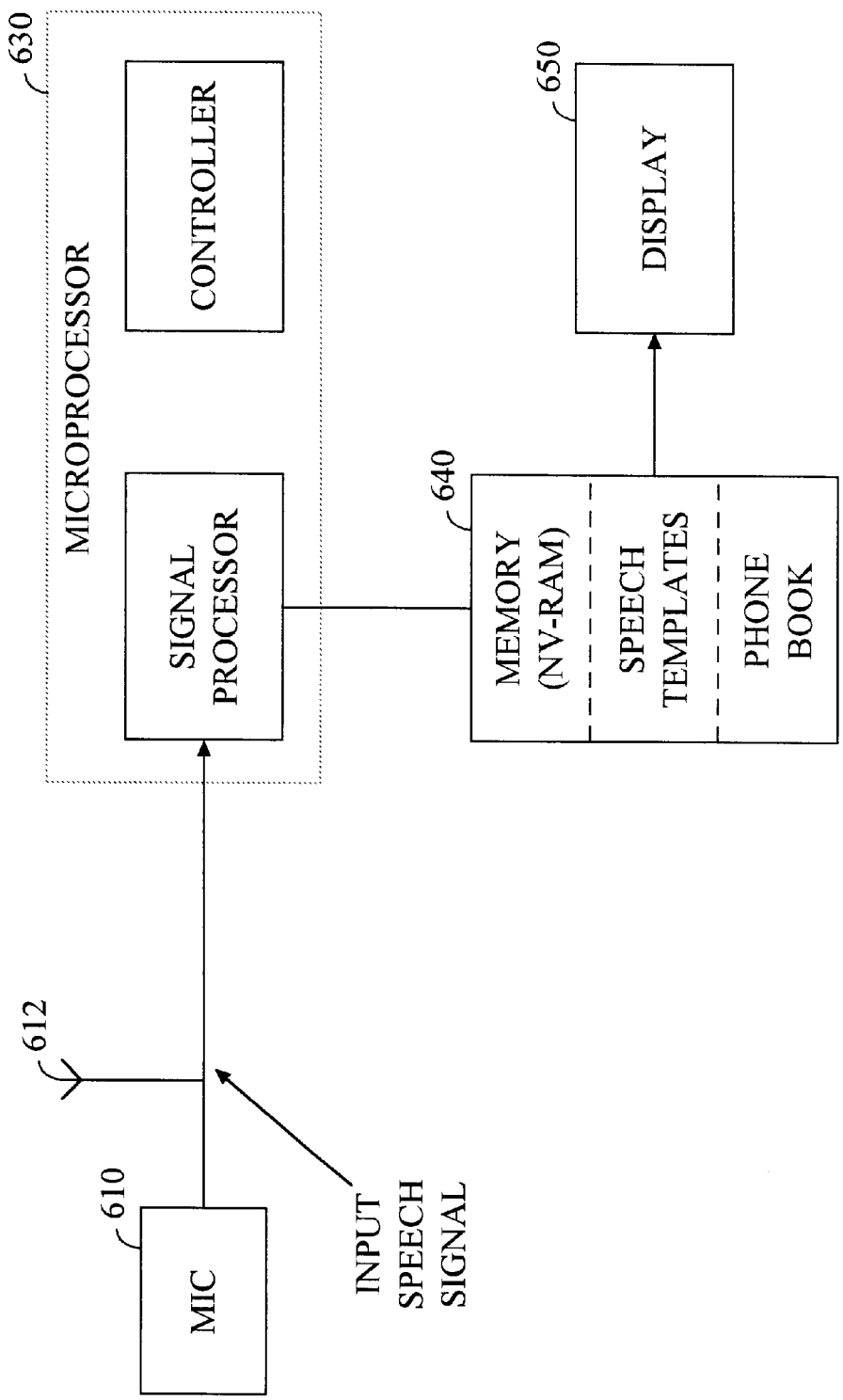
FIG. 6 is a hardware block diagram showing a system for implementing the speech signal segmentation and recognition systems shown in FIGS. 1–3.

As shown in FIG. 6, method 300 may be applied in the context of a mobile telephone to allow a user to automatically recall a telephone number stored in the telephone's memory. In this example, a user will utter the name of a person that the user wants to call into the telephone's microphone 610 (alternatively, a speech signal representative of the user may be supplied via antenna 612). The utterance will then be converted into a segmented speech signal using the time-clustering system and method of the present invention in the microprocessor 630. Steps 320–350 are preferably implemented in software using microprocessor 630. The segmented speech signal will then be compared by microprocessor 630 against speech templates stored in the telephone's memory 640 (wherein each of the stored templates corresponds to the name of a person associated with a telephone number stored in the telephone's memory 640). The stored template that is closest to the segmented speech signal will then be selected, and the telephone number (also stored in the phone memory 640) associated with the selected template will then be recalled from memory 640 and provided to the user on the telephone display 650.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. In a speech recognition system, a method for forming a segmented speech signal from an input speech signal having a plurality of frames, comprising the steps of:

converting said input speech signal from a time domain signal to a frequency domain signal having a plurality of speech frames, wherein each speech frame in said frequency domain signal is represented by at least one spectral value associated with said speech frame;

assigning an initial cluster boundary between each pair of adjacent frames in said frequency domain signal to define a cluster for each said speech frame;

assigning a variance value to each said cluster based on said at least one spectral value associated with the frames in each cluster;

forming a merged cluster by canceling a cluster boundary between a pair of adjacent clusters based on said variance values;

repeating the steps of assigning a variance value and forming a merged cluster in order to form a predefined number of merged clusters; and forming said segmented speech signal in accordance with said predefined number of merged clusters.

2. The method of claim 1, wherein said step of assigning a variance value to each cluster initially assigns a variance value of a spectral difference value representative of a difference between said at least one spectral value associated with said frames of each cluster defined by said initial cluster boundaries, and subsequently assigns variance values representative of variance values of adjacent clusters forming said merged clusters.

3. The method of claim 2, wherein said subsequently assigned variance values are determined by summing said variance values of said adjacent clusters forming said merged clusters.

4. The method of claim 2, wherein each speech frame ($F_n$) in said frequency domain signal is represented by a plurality (I) of values ($S_{n,i}$) and said spectral difference value for each pair of adjacent frames ($D_{n-1, n}$) is determined as follows:

$$D_{n-1,n} = \sum_{i=1}^{I} |S_{n-1,i} - S_{n,i}|.$$

5. The method of claim 1, wherein said step of forming a merged cluster comprises the steps of:
   calculating a plurality of cluster merge parameters, wherein each of said cluster merge parameters is associated with a pair of adjacent clusters;
   selecting a minimum cluster merge parameter from said plurality of cluster merge parameters; and
   forming said merged cluster by canceling a cluster boundary between said pair of adjacent clusters associated with said minimum merge parameter.

6. The method of claim 5, wherein each of said plurality of cluster merge parameters (CMP) is determined in accordance with said variance values ($V_i$) and first and second weighting factors (w1, w2) as follows:

$$CMP_i = w_1 * V_i + w_2 * (V_i + V_{i-1}), i=2,3,\ldots,c.$$

7. The method of claim 1, wherein said step of forming said segmented speech signal further comprises forming a representative vector of values $S_i^{rep}$ associated with each of said plurality of merged clusters.

8. The method of claim 7, wherein each of said values $S_i^{rep}$ in each representative vector is determined in step (i) as follows:

$$S_i^{rep} = \frac{1}{N(i)} \sum_{n=1}^{N(i)} S_{n,i}$$

where N(i) represents the number of frames in cluster $i$.

9. The method of claim 1, wherein step (i) further comprises selecting a representative vector of values ($S_{n,i}$) associated with each of said plurality of merged clusters by determining an average vector of values associated with each of said plurality of merged clusters and then selecting a vector associated with a frame in said cluster that is closest in Euclidean space to said average vector.

10. The method of claim 1, wherein said input speech signal is converted in step (a) from said time domain signal to said frequency domain signal using a transformation selected from the following group of transformations: Fourier transformations, bandpass filter bank, linear predictive coding coefficients, line spectrum pairs (LSP) and cepstral coefficients.

11. The method of claim 1, wherein said input speech signal has first and second endpoints, wherein said first and second endpoints respectively correspond to a beginning and an end of a speech utterance.

12. The method of claim 11, wherein said speech utterance is a known speech utterance, further comprising the step of saving said segmented speech signal as a template.

13. The method of claim 1, further comprising the step of selecting a speech utterance associated with said segmented speech signal by comparing said segmented speech signal to each of a plurality of speech templates, wherein each of said plurality of speech templates corresponds to a known speech utterance.

14. The method of claim 1, further comprising the step of storing said segmented speech signal in memory.

15. An apparatus for forming a segmented speech signal, comprising:

(a) an acoustic to electrical transducer that converts an acoustic signal into an electrical signal;
(b) a microprocessor for processing the electrical signal, the microprocessor including:
   means for converting said input speech signal from a time domain signal to a frequency domain signal having a plurality of speech frames, wherein each speech frame in said frequency domain signal is represented by at least one spectral value associated with said speech frame;
   means for assigning an initial cluster boundary between each pair of adjacent frames in said frequency domain signal to define a cluster for each said speech frame;
   means for assigning a variance value to each said cluster based on said at least one spectral value associated with the frames in each cluster;
   means for forming a merged cluster by canceling a cluster boundary between a pair of adjacent clusters based on said variance values;
   means for repeating the steps of assigning a variance value and forming a merged cluster in order to form a predefined number of merged clusters; and
   means for forming said segmented speech signal in accordance with said predefined number of merged clusters.

16. An apparatus for forming a segmented speech signal, comprising:
   a transducer configured to convert an acoustic signal to an electrical signal; and
   a processor coupled to the transducer and configured to:
      convert the electrical signal from a time domain signal to a frequency domain signal having a plurality of speech frames, wherein each speech frame in the frequency domain signal is represented by at least one spectral value associated with the speech frame;
      assign an initial cluster boundary between each pair of adjacent frames in the frequency domain signal to defined a cluster for each speech frame;
      assign a variance value to each cluster based on the at least one spectral value associated with the frames in each cluster;
      form a merged cluster by canceling a cluster boundary between a pair of adjacent clusters based on the variance values;
      continue assigning variance values and forming merged clusters in order to form a predefined number of merged clusters; and
      form the segmented speech signal in accordance with the predefined number of merged clusters.

17. The apparatus of claim 16, wherein the processor is further configured to initially assign a variance value of a spectral difference value representative of a difference between the at least one spectral value associated with the frames of each cluster defined by the initial cluster boundaries, and subsequently assign variance values representative of variance values of adjacent clusters forming merged clusters.

18. The apparatus of claim 17, wherein the processor is further configured to determined the subsequently assigned variance values by summing the variance values of the adjacent clusters forming the merged clusters.

19. The apparatus of claim 16, wherein the processor is further configured to form the merged cluster by calculating a plurality of cluster merge parameters, wherein each of the cluster merge parameters is associated with a pair of adjacent clusters, selecting a minimum cluster merge parameter from the plurality of cluster merge parameters, and forming the merged cluster by canceling a cluster boundary between the pair of adjacent clusters associated with the minimum merge parameter.

20. The apparatus of claim 16, wherein the processor is further configured to select a representative vector of values associated with each of the plurality of merged clusters by determining an average vector of values associated with each of the plurality of merged clusters and then selecting a vector associated with a frame in the cluster that is closest in Euclidean space to the average vector.

21. The apparatus of claim 16, wherein the processor is further configured to convert the electrical signal from the time domain signal to the frequency domain signal using a transformation selected from the following group of transformations: Fourier transformation, bandpass filter bank, linear predictive coefficients, line spectrum pairs, and cepstral coefficients.

22. The apparatus of claim 16, wherein the electrical signal has first and second endpoints, wherein the first and second endpoints respectively correspond to a beginning and an end of a speech utterance.

23. The apparatus of claim 22, further comprising a storage element coupled to the processor, wherein the speech utterance is a known speech utterance and the segmented speech signal is saved as a template in the storage element.

24. The apparatus of claim 16, wherein the processor is further configured to select the speech utterance associated with the segmented speech signal by comparing the segmented speech signal to each of a plurality of speech templates, wherein each of the plurality of speech templates corresponds to a known speech utterance.

25. The apparatus of claim 16, further comprising a storage element coupled to the processor, wherein the processor is further configured to store the segmented speech signal in the storage element.

* * * * *